United States Patent

[11] 3,615,959

[72] Inventor Larry J. Nance
 Houston, Tex.
[21] Appl. No. 843,451
[22] Filed July 22, 1969
[45] Patented Oct. 26, 1971
[73] Assignee Schlumberger Technology Corporation
 New York, N.Y.

[54] VACUUM FILLING PROCESS FOR LIQUID FILLED MARINE SEISMIC CABLES
 3 Claims, 6 Drawing Figs.

[52] U.S. Cl................................................. 156/48, 340/7
[51] Int. Cl........................................H01b 13/00, H01b 17/34
[50] Field of Search............................................ 156/48, 141; 340/7

[56] References Cited
UNITED STATES PATENTS
2,024,144 12/1935 Chase.......................... 156/48
2,781,285 2/1957 White et al. .................... 156/48
3,290,194 12/1966 Gillemot....................... 156/48
3,342,162 9/1967 Priaroggia et al............. 156/48
3,434,104 3/1969 Stapleton et al. ............. 340/7
3,439,319 4/1969 Whitfill, Jr.................... 340/7

Primary Examiner—Benjamin A. Borchelt
Assistant Examiner—Harold Tudor
Attorneys—Stewart F. Moore, David L. Moseley, Edward M. Roney, William R. Sherman, Ernest R. Archambeau, Jr. and William J. Beard ABSTRACT: A technique for completely filling a stoppered hollow marine seismic cable with a compatible filling liquid such as kerosene, wherein the air in a hollow cable on a spool is first evacuated with a vacuum pump, and wherein the liquid is thereafter pumped into the cable until it is full. Improved evacuation and filling means are also provided which prevent loss of vacuum during the filling process.

PATENTED OCT 26 1971
3,615,959
SHEET 1 OF 2
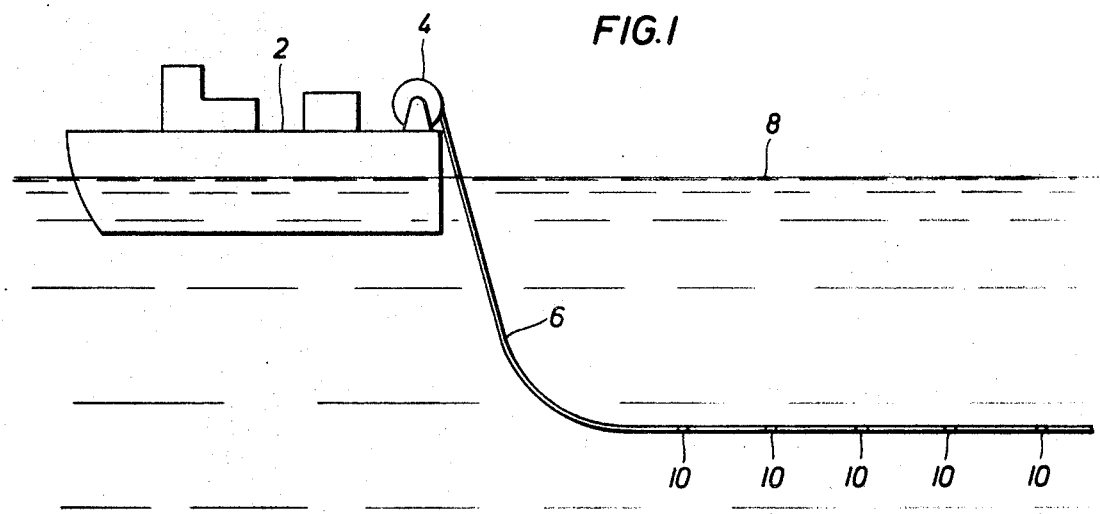
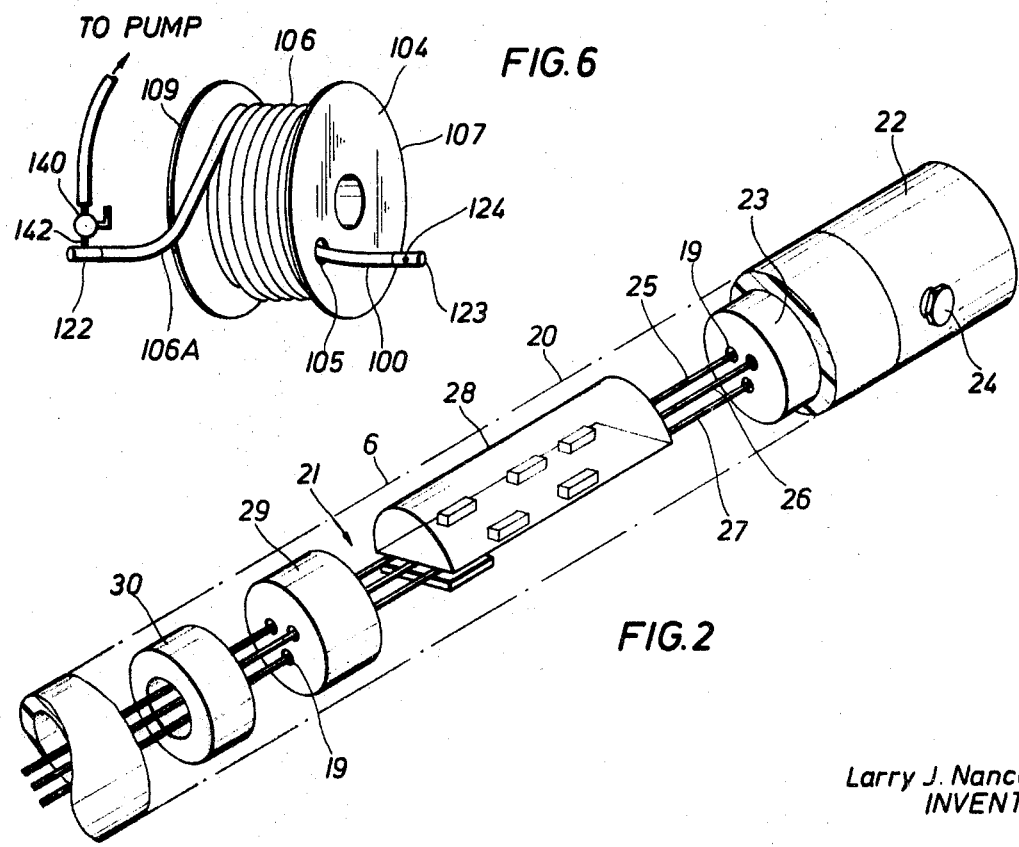
Larry J. Nance
INVENTOR
BY Arnold, Roylance,
Kruger & Durkee
ATTORNEYS Larry J. Nance
INVENTOR BY Arnold, Roylance,
Kruger & Durkee
ATTORNEYS

3,615,959

VACUUM FILLING PROCESS FOR LIQUID FILLED MARINE SEISMIC CABLES

BACKGROUND OF INVENTION

This invention relates to methods and apparatus for completely filling a contorted hoselike body with a liquid, and more particularly, relates to improved methods and apparatus for filling marine seismic cable with kerosene or the like while the cable is wound on a spool.

It is well known to recover oil and gas through boreholes which are drilled into subsurface earth formations, and it is further well known that such formations may be located below the floor of the ocean. In prospecting for offshore oil and gas bearing formations, it is conventional to trail a hollow marine seismic cable behind the stern of a ship or other vessel for the purpose of investigating the subsurface character of the submerged earth. As may be seen in U.S. Pat. No. 3,439,319, it is desirable for such purposes that the cable be positioned along substantially its entire length at a preselected uniform depth. It is necessary that the cable be substantially entirely filled with a liquid such as kerosene or the like to render the cable neutrally buoyant in the water. Paravanes and weights and the like may be used to position the cable at a preselected depth in the water during its use.

It will be readily apparent that a typical marine seismic cable is awkward and inconvenient to handle and store because of its bulk and length. Thus, it is conventional to roll the cable on a large spool during and after fabrication, and the cable is usually kept wound on the spool at all times except when it is being used or repaired.

As may be seen in Pat. No. 3,439,319, however, the cable is composed of a tubular sheath loaded with electrical leads, geophones, cable supports and the like, which are spaced apart so as to establish a plurality of compartments within its interior and along its length. Although there is communication between these compartments throughout the length of the cable, such communication is only by way of relatively narrow openings for admitting the conductors. Hence, it will be readily apparent that it is extremely difficult to flow the liquid between the various internal spaces and compartments so as to fill the entire length of the cable with liquid without trapping air in one or more of these compartments.

These air pockets in the cable constitute locations of inherent weakness when the cable is submerged. Further, it is much more difficult to maintain the cable at a preselected depth in the water when the cable contains pockets of entrapped air. Accordingly, it is sought to completely fill the cable with liquid before it can be satisfactorily used for its intended purpose, notwithstanding the obvious difficulty of conducting liquid from one end of the cable, to the other end, without trapping any substantial amount of air at any point along its length. Furthermore, the task of filling the cable is even more difficult when the cable is wound about the spool.

Accordingly, the usual practice is to first unwind the cable from the spool, and to stretch it out flat before attempting to fill it with the buoyant liquid. Thereafter, the kerosene or other liquid is poured or injected into one end of the cable while it is held at an elevation above the other end which is kept open to permit the air to escape. During the pouring step, however, the cable is manipulated, twisted, and vigorously pounded with cudgels, or the like, in order to drive out any air entrapped in any of the compartments along the length of the cable. After the cable has been completely filled with liquid in this manner, both ends are usually stoppered to prevent spillage or leakage of the liquid.

Although the foregoing technique is the most common process for filling a cable of this type, it is obviously unsatisfactory for several reasons. In the first place, pounding the cable with cudgels or the like often damages one or more of the geophones in the cable. Second, it usually requires strenuous effort by several workmen for 3 to 4 hours to fill a cable of merely average length. Third, it is often inconvenient to the operation and safety of the ship, to unwind the cable from the spool and stretch it out on the deck, and finally, any spillage or leakage of kerosene is a clear risk of fire, which is particularly undesirable on board a ship.

SUMMARY OF INVENTION

These and other disadvantages of the prior art are overcome with the present invention, and improved methods and apparatus are provided herein for conveniently filling a conventional marine seismic cable with a liquid without appreciable spillage, in a relatively short time, and without the necessity for removing the cable from its spool.

In the broadest form of the preferred embodiment of the present invention, one end of the multicompartmented cable is kept stoppered during the filling process. The other end of the cable is provided with a pluglike member having a filling aperture which is internally threaded for a gastight connection with the outlet end of s stop cock or other suitable valve having its intake end adapted to be connected to one end of a flexible hose.

This intake end of the stop cock is preferably adapted to be connected to a hose which communicates with a suitable vacuum pump, whereby substantially all of the air may be initially evacuated from the cable. After a sufficient partial vacuum has been developed within the cable, the stop cock is closed to maintain this vacuum, and the hose leading to the pump is disconnected from the stop cock and replaced by a second hose which leads to a pump connected to a supply of liquid. The stop cock is again opened, and the pump is then activated to pump in liquid until the cable is filled. Thereafter the stop cock may be unscrewed from the filling plug member and replaced by a conventional threaded stopper to keep the liquid from leaking out of the cable through the filling aperture in the pluglike member.

It will be apparent that, with the foregoing technique, there is substantially no air in the cable to be entrapped therein by the kerosene. Thus, the cable may be filled while wound on the spool or in any other contorted configuration (except kinked), and there is no necessity for pounding the exterior of the cable merely to dislodge air bubbles in the various compartments. Furthermore, the cable may now be transmitted to and loaded aboard ship while empty, and need not be filled and sealed before leaving the manufacturer. Moreover, a cable of average length (such as 300–350 feet) may be easily evacuated and filled with liquid in approximately 10 minutes or less, whereas with the practice of the prior art, such a cable could not ordinarily be filled properly in less than 3 hours. Additionally, much labor time is saved in not having to unwind and wind the cable on the spool, and the likelihood of damaging the cable components due to handling is eliminated.

These and other features and advantages of the prior art will be apparent from the following detailed description, wherein reference is made to the figures in the accompanying drawings.

DRAWINGS

FIG. 1 is a simplified pictorial representation of a floating vessel trailing a typical marine seismic cable or the like in a conventional manner for purposes of investigating the subsurface character of the submerged earth.

FIG. 2 is a pictorial representation exposing the internal configuration of a cable of the type depicted in FIG. 1.

FIG. 6 is a pictorial representation of a marine seismic cable wound on a spool or the like in a manner suitable for the purposes of the present invention and provided with end fittings of the type depicted in FIG. 3.

DETAILED DESCRIPTION

Figure 3:
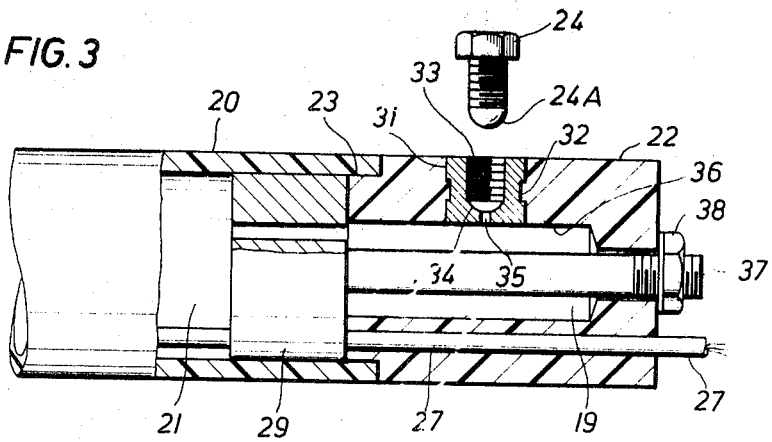
FIG. 3 is a pictorial representation, partly in cross section, of a device suitable for providing means for evacuating air from within a marine seismic cable or the like, and for replacing the evacuated air with a liquid such as kerosene.

Referring first to FIG. 1, there may be seen a simplified pictorial representation of a vessel 2 towing a marine seismic cable 6 behind it in a conventional manner. As illustrated, a winch or spool 4 may be mounted on the fantail or other stern portion of the vessel 2, whereby the cable 6 may be paid out behind the vessel 2 as it moves forward. As further illustrated, suitable means such as paravanes (not depicted), depth controllers, or the like may be used to maintain the greater portion of the cable 6 at a uniform depth below the surface 8 of the water, whereby the geophones 10 may be located at the same depth in the water.

Referring now to FIG. 2, there may be seen a pictorial representation of a portion of a typical marine seismic cable 6 such as that depicted in FIG. 1, and showing how the cable 6 includes a flexible tubular sheath 20 formed of clear vinyl or the like and containing a plurality of spaced-apart annular supporting rings hereinafter referred to as anchors 29 (only one depicted) for providing internal support. A geophone 30, which may be any suitable device such as a piezoelectric transducer, may be mounted in the sheath 20 at selected intervals, and a plurality of electrical conductors or leads 25–27 may extend along the length of the cable 6 for transmitting power and information signals along its length. As further illustrated, the cable 6 may include a plurality (only one depicted) of depth sensors 28 for providing continuous information as to the actual depth of the cable 6 during its operation and use.

In a preferred embodiment of the present invention, the cable 6 may be stoppered at one end by a partially hollow filling stopper 22, having a central passageway 19 opening only into the interior 21 of the sheath 20, and having a lateral fill passage closed by a removable threaded fill plug 24. The end of the sheath 20 may be seen to be slidably fitted about a nose portion 23 of the stopper 22 and secured thereto by any suitable means or technique.

As hereinbefore stated, it is conventional to fill the interior of the cable 6 with a liquid such as kerosene, and in the present invention as well as in the case of the techniques of the prior art, this is done by pouring or driving the kerosene into one end of the sheath 20 to fill its interior 21 region. More particularly, the kerosene is conducted into the interior 21 of the sheath 20 by way of the fill passage closed by the plug 24 and the passageway 19 in the filling stopper 22. In a typical cable 6, such as that depicted in FIG. 2, the sheath 20 may be a flexible seamless vinyl tubing having an inside diameter of 2⅛ inches, and having a more or less transparent or clear wall ⅛ inch thick. As will be apparent from FIG. 2, however, the interior region 21 of the sheath 20 is effectively divided into a series of compartments by components positioned therein, such as anchors 29, geophones 30, depth sensors 28, and the like, which are spaced apart at preselected locations along the length of the cable 6. Furthermore, liquid flow between these compartments is difficult due to the necessity of flowing through restricted apertures in the components, and especially due to the fact that the opposite end (not depicted) of the cable 6 is also stoppered in the case of the present invention. Heretofore there has been no way of injecting the kerosene while the cable 6 is wound about the spool 4. Nevertheless, it is necessary as hereinbefore explained to substantially completely fill the cable 6 with kerosene, or the like, in order to avoid trapping any appreciable amount of air in any of these compartments.

Referring now to FIG. 3, there may be seen a more detailed pictorial representation, partly in cross section, of the filling stopper 22 depicted more generally in FIG. 2. In particular, the filling stopper 22 may be seen to have a nose portion 23 slidably inserted in the open end of the sheath 20 and having a central passageway 19 as hereinbefore stated. The stopper 22 may be fastened in the end of the sheath 20 by any suitable means. For example, an anchor 29 having a plurality of narrow passages (restricting fluid flow thereacross) for supporting conductors such as leads 25–27, and for conducting kerosene along the interior 21 of the sheath 20, may be secured fixedly within the sheath 20. A suitable bolt 37, fastened in the anchor 29, may extend through the passageway 19 and through the closed end of the filling stopper 22, and a suitable nut 38 may be used to hold the stopper 22 in the end of the sheath 20.

The stopper 22 may further include a hollow insert 31 embedded in the wall of the stopper 22 and secured therein by means of an annular groove 32. As illustrated, the insert 31 contains internal threads 33 for accommodating the plug 24, but is further provided at its inner end with an internal shutoff surface 34 and a centrally located port 35. As further illustrated, the lower end 24A of the plug 24 is fashioned to sealingly engage the surface 34 when the plug 24 is inserted into the insert 31, since the threads 33 will not provide a pressuretight seal between the inside surface 36 of the stopper 22 and its outside surface.

Figure 4:
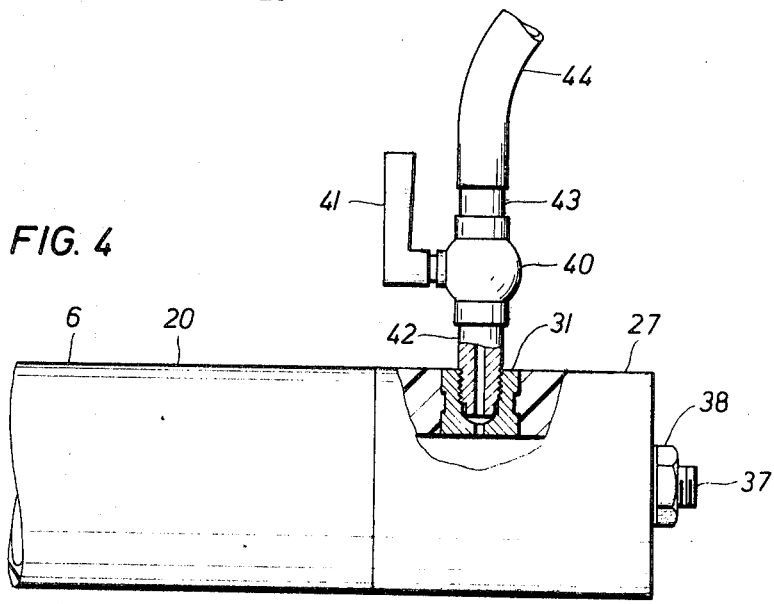
FIG. 4 is a pictorial representation, partly in cross section, of a suitable stop cock or other valve arranged to connect the interior of a marine seismic cable with either a vacuum pump or a supply of liquid.

Referring now to FIG. 4, there may be seen a simplified exterior view of the portion of the cable 6 including the filling stopper 22 inserted and locked in the end of the sheath 20 by means of the bolt 37 and nut 38 hereinbefore described. In FIG. 4, however, the plug 24 has been replaced by a stop cock 40 or other suitable valve means, having a shutoff handle 41, and having a nipple end 42 threaded to fit into the insert 31. More particularly, the nipple end 42 may be seen to be provided with a shutoff surface at its end for engaging the inside shutoff surface of the insert 31 in a fluid or pressuretight manner. A hose 44 may be removably attached to the hose end 43 of the stop cock 40 for providing the kerosene or for other purposes as will hereinafter be explained.

Figure 5:
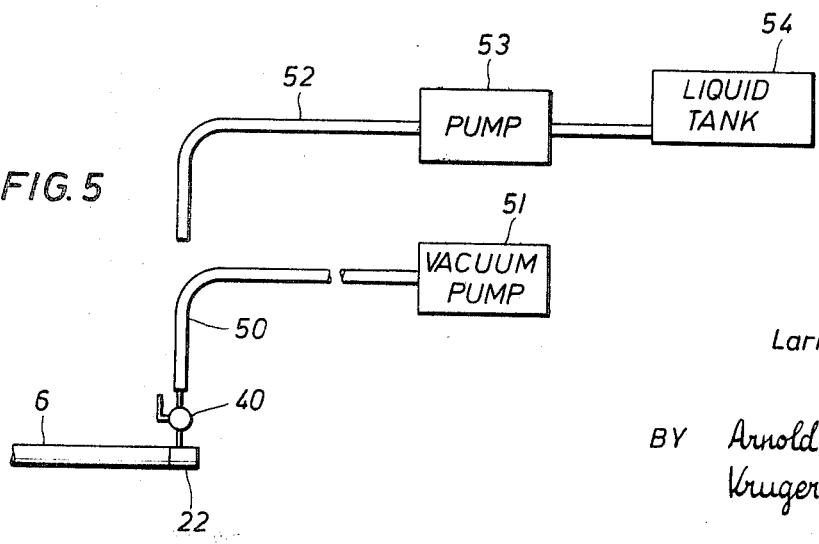
FIG. 5 is a functional representation of the overall configuration of a system for evacuating and refilling a marine seismic cable with a liquid such as kerosene.

Referring now to FIG. 5, there may be seen a simplified functional arrangement of apparatus for filling a marine seismic cable of the type depicted in FIG. 1 with kerosene while it is wound on a spool 4. As depicted, the free end of the cable 6 preferably contains a filling stopper 22 wherein the plug 24 has been removed and replaced with the threaded nipple end 42 of the stop cock 40. In this arrangement, the shutoff surface of the nipple end 42 is fluid or pressuretightly urged into engagement with the inside shutoff surface 34 of the insert 31.

Initially, the hose 50 which is connected to the hose end 43 of the stop cock 40 is connected to a suitable vacuum pump 51, and it should be understood that the opposite end (not depicted) of the cable 6 is stoppered by any suitable means. Accordingly, the stop cock 40 may be opened, and the interior region 21 of the sheath 20 may now be evacuated of air to an internal pressure of approximately 30 inches of vacuum.

After evacuation of the sheath 20, which may be accomplished within 3–4 minutes or less with a vacuum pump 51 of suitable capability, the stop cock 40 is closed and hose 50 may be removed and replaced with hose 52. Alternatively, the stop cock 40 may be replaced with a suitable 3-way valve, or the like, to eliminate the necessity for removing hose 50 and replacing it with hose 52. What is essential, is that the threaded nipple end 42 of the stop cock 40 be in pressuretight engagement with the insert 31 in the filling stopper 22. After hose 52 has been attached, however, the stop cock 40 is again opened and kerosene from tank 54 is pumped into the sheath 20 by a suitable pump 53 until the sheath 20 is full. The threaded nipple end 42 of the stop cock 40 may now be removed and replaced with the plug 24 to keep kerosene from leaking out of the sheath 20.

Referring now to FIG. 6, there may be seen a simplified pictorial representation of a conventional spool 104 or the like, having wound thereon a marine seismic cable 106 of conventional design and length. As may further be seen, the dangling or free end 106A of the cable 106 may be provided with a filling stopper 122 of the type depicted in FIG. 3, and having a nipple 142 and stop cock 140 whereby the interior of the cable 106 may be evacuated and thereafter filled with liquid as hereinbefore described. The opposite end 100 of the cable 106 is preferably made accessible by having it disposed conveniently through a small aperture 105 in one of the flanges 107 and 109 of the spool 104. Accordingly, this end 100 may be plugged with any suitable stoppering device such as another filling stopper 123 of the type used to close the free end 106A of the cable 106, prior to evacuation of its interior. In such a case, however, the nipple 42 and stop cock 40 depicted in FIG. 3 is preferably omitted, and a plug 124 may be inserted to seal the interior of the cable 106.

Because of the difficulty of properly filling a marine seismic cable 106 by conventional techniques, the cable 106 has heretofore usually been filled at the factory. However, this has required that the assembled cable 106 be transported to its destination while filled with liquid, and this has greatly increased its shipping weight and handling difficulty.

If the cable 106 is delivered on board the vessel while wound on a spool 104 in the manner depicted in FIG. 6, the cable 106 may now be easily and quickly filled with any suitable liquid while mounted on the spool 104, and this eliminates the necessity for removing it from the spool 104 and stretching it out on the deck of the vessel as hereinbefore described. Accordingly, the cable 106 may now be transported to the vessel and stored thereon while empty, since it need not now be filled with liquid until just before it is to be used.

Referring again to FIG. 5, it will be noted that it is essential to the objects of the present invention that the low pressure, which was established in the cable 6 by means of the vacuum pump 51, be maintained in the cable 6 after the hose 50 has been replaced by the hose 52 interconnected to the pump 53 and kerosene supply 54. Furthermore, it is essential that this low pressure be raised during the operation of the kerosene injection pump 53 only by virtue of the flow of kerosene into the cable 6, and not due to leakage of ambient air into the cable 6. Accordingly, it has been found desirable for the purposes of the present invention that the kerosene pump 53 be of the positive displacement type.

It will further be apparent from the foregoing that various modifications and variations may be made in the structures and procedures described herein without substantial departure from the essential concepts of the present invention. Accordingly, it should be clearly understood that the forms of the invention described herein and depicted in the accompanying drawings, are exemplary only and are not intended as limitations on the scope of the present invention.

What is claimed is:

1. A method of substantially filling the interior of a flexible, tubular, nonmetallic marine seismic cable containing seismic components with a liquid, comprising the steps of:
   winding said cable onto a spool or the like,
   closing off the interior of said cable from the atmosphere
   thereafter, reducing the pressure in said isolated interior of said cable wound on said spool below atmospheric pressure by applying a vacuum to one end of said cable,
   maintaining the reduced pressure in said cable,
   thereafter, conducting liquid into the cable at the reduced pressure to fill the interior with said liquid and
   thereafter, when said liquid fills the interior of the cable, sealing said liquid in said cable.

2. A method for filling flexible, nonmetallic hollow marine seismic cables with a liquid while spooled on a drum, comprising the steps of:
   closing off one end of a hollow marine seismic cable spooled on a drum,
   applying a suction to the other end of said cable to evacuate air from the interior of said cable and to reduce the pressure therein,
   thereafter, without disturbing the condition of the reduced pressure in the interior of the cable, supplying a flow of liquid under pressure to said other end of said cable until the cable is filled with liquid, and
   sealing said other end to entrap the liquid within the cable.

3. A method of substantially filling the interior of a coiled, flexible, hollow, nonmetallic marine seismic cable or the like with a liquid, comprising
   connecting a vacuum pump to the interior of said cable at a selected end thereof and sealing off the other end,
   actuating said pump and evacuating air from the interior of said cable through said selected end to reduce the pressure in the cable,
   after reducing the pressure in the cable, sealing the interior of said cable from ambient atmospheric pressure,
   disconnecting said vacuum pump from the interior of said cable without disturbing the reduced pressure in the cable,
   connecting a supply of liquid to said selected end of said cable,
   opening the interior of said cable to said supply of liquid, and
   pumping liquid from said supply into the interior of said cable through said selected end thereof until said interior is at least substantially filled with liquid,
   disconnecting said supply of liquid from said cable, and
   sealing said liquid in said cable.

* * * * *